Aug. 6, 1940.　　　J. C. PARRISH　　　2,210,124
ADJUSTABLE GAUGE
Filed Nov. 8, 1937
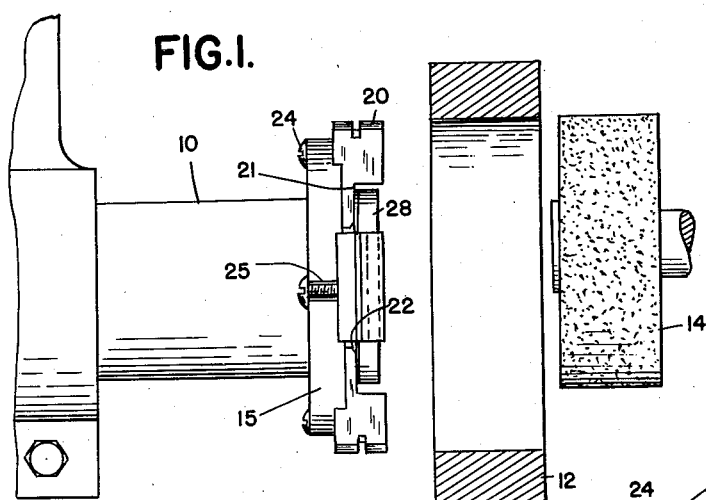
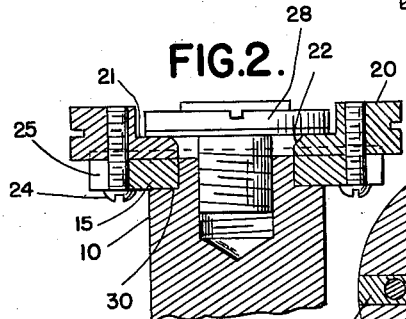
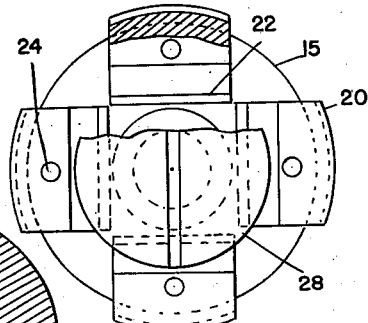
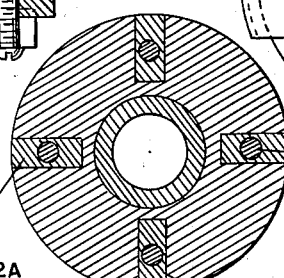
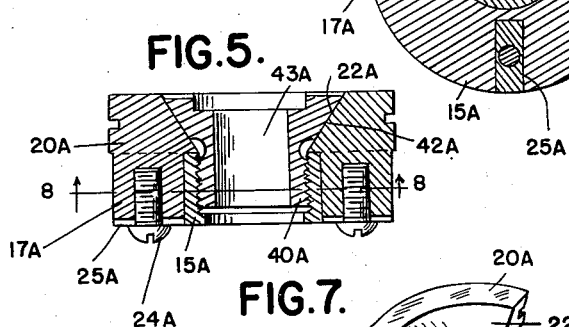
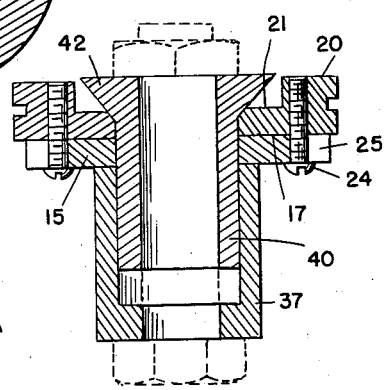
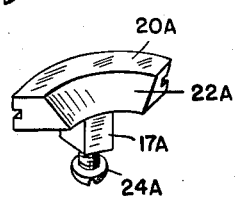
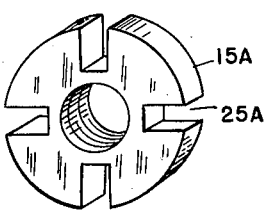
INVENTOR.
John C. Parrish
BY Swan, Frye Hardesty
ATTORNEYS Patented Aug. 6, 1940

2,210,124

UNITED STATES PATENT OFFICE 2,210,124

ADJUSTABLE GAUGE

John C. Parrish, Detroit, Mich.

Application November 8, 1937, Serial No. 173,373

3 Claims. (Cl. 33—178)

This invention relates to adjustable gauges for testing the internal dimensions of openings.

Gauging of internal diameters with extreme accuracy, such as is necessary during accurate grinding operations, has heretofore been done almost exclusively with disc-like gauges, solidly formed of a single piece of metal. Where used continuously or with great frequency, as in automatic grinding machines, the life of such a gauge is relatively short due to unavoidable wear, although they are constructed of hard material and are made as rigid as possible, and of course maintenance of accuracy depends upon these factors. The present invention aims to provide an improved gauge of this character which is simple and inexpensive, rigid and able to maintain its accuracy for long periods, yet quickly and easily adjustable to compensate for wear.

A further object is the provision of improved means for adjustably moving the gauge blocks of such an adjustable gauge.

Still another object is the provision of such a gauge which is of extremely compact construction, incorporating gauge blocks adapted to project radially from a point at the extreme end of an arm by which the gauge is supported, whereby the gauge may be projected to the bottom of a blind opening, or close to other apparatus without interference.

Other objects and advantages will be apparent from the following description, wherein reference is made to the accompanying drawing illustrating preferred embodiments of my invention and wherein similar reference numerals designate similar parts throughout the several views.

In the drawing:

Figure 1 is a side elevational view of an adjustable plug gauge incorporating the principles of this invention, showing a typical mounting of the same in association with a grinding wheel, and showing in diametrical cross section the work to be gauged.

Figure 2 is a diametrical cross section of my improved gauge showing the same mounted upon its support arm.

Figure 3 is a front elevational view of the gauge, one gauge block and the mounting screw being partly broken away.

Figure 4 is a view showing the gauge in diametrical cross section mounted in an improved expanding device for outward adjustment of the gauge blocks.

Figure 5 is a diametrical cross sectional view of a gauge of somewhat modified construction.

Figures 6 and 7 are perspective views of the body and one gauge block of the modified construction.

Figure 8 is a detailed cross section taken substantially on the line 8—8 of Figure 5 and looking in the direction of the arrows.

Figure 9 is a side elevational view of the built-in adjusting screw.

Referring now to the drawing, reference character 10 designates a supporting gauge arm, by which my improved gauge is adapted to be supported in alignment with and moved into and out of the opening in the work 12, in order to determine whether or not the opening has reached required dimensions. The gauge arm and the tool 14, shown as a grinding wheel, move in unison with respect to the work, the gauge advancing into the work as the tool recedes, and vice versa.

The gauge comprises a disc-like supporting body 15 having radial grooves 17 forming slideways in its front surface. Accurately slidable in such grooves are gauge blocks 20 individually movable toward and from the central opening in the gauge body 15, through which opening projects a supporting stem 10. The inner end of each gauge block is of reduced thickness, providing a flat surface designated 21, while an inclined corner 22 at the inner end provides a cam surface by which the blocks may be driven outward during adjustment, as will be presently described.

Locking screws 24 project through the face of the supporting disc 15 and into the gauge blocks. The stems of the screws are adapted to travel in radial slots 25 in the body 15, the slots being open at the periphery of the body. It will be apparent that when the screws 24 are loosened, the blocks may be moved radially, while when the screws are tightened, the blocks are rigidly held against movement.

The gauge assembly is held upon the stem 10 by means of a screw 28 threaded into a tapped opening in the end of the stem. The head of the screw bears against the flats 21, thereby also pressing the gauge blocks against the plate 15, to further lock the blocks in position. The plate 15 is backed by a shoulder 30 formed upon the stem, against which shoulder the gauge assembly is clamped by the screw 28.

When removed from the stem for adjustment, the gauge assembly may be placed inside a master ring gauge (not shown), and the gauge blocks 20 moved outward into contact therewith in any suitable manner, the screws 24 being of course first loosened, and after such adjustment tightened to fix the gauge in readjusted position, whereafter it may again be placed in service.

Suitable means for uniformly moving the gauge blocks outwardly during adjustment, as shown in Figure 4, may comprise a support 37, on top of which the gauge assembly is adapted to be rested, having an opening therein into which slides an actuating cam portion 40, which is passed through the gauge assembly and provided with a head 42 having an inclined under surface adapted to overhang and bear against the inclined actuating cam surfaces 22 at the inner ends of the gauge blocks. With set screws 24 loosened, it is only necessary to drive the head 42 downwardly, as by tapping it with a hammer, to spread the blocks 20 into engagement with the interior of the master ring gauge 35. Thereafter tightening the locking screws 24, sets the gauge to readjusted size. The head portion 40 and support 37 are also axially apertured, enabling similar spreading of the gauge blocks by merely passing a bolt through the portions 37—40, in the manner indicated in dotted lines in Figure 4, and tightening a nut upon the bolt to force the camming head 42 against the tapered inner ends of the gauge blocks. After resetting the blocks, the gauge assembly is ready for removal from the spreading assembly 37—40 and may again be placed in service.

In the somewhat modified construction shown in Figures 5 to 9 inclusive, the disc-like body 15A is similarly provided with radial guide slots 25A, the ends of which are open at the periphery. The central aperture in the disc 15A is threaded to receive the adjusting screw 40A, the frusto-conical under side of the head 42A of which constitutes an adjusting cam for spreading the blocks 20A. The peripheral working surfaces of the block elements 20A are of similar segmental form, while the inner end of each is partly conical. An integral guide portion 17A projects downwardly from the under side of each gauge block, such guide portions being of rectangular form and proportioned to fit accurately and slide in the guide slots 25A in the supporting disc 15A, although they are not of sufficient length to project entirely through the disc. The bottom of each guide portion 17A is tapped to receive a set screw 24A, the head of which overlies the back face of the disc, to enable clamping the block when the screw is tightened, and free movability thereof when screws are loosened.

The inner camming surfaces 22A of each block, being of partly conical form, the adjusting screw 40A engages the blocks over a substantial area. The adjusting screw 40A may either be left in place during use of the gauge or removed, the aperture 43A in the screw enabling passing the bolt (not shown) by which the assembly is secured to its supporting stem, through the entire gauge assembly.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. An adjustable gauge for internal diameters, comprising a body having a plurality of substantially radial slideway portions, gauge members carried by said body and slidable in said slideway portions, said gauge members having partly cylindrical outer surfaces, individual set screw means for locking each of said gauge members against sliding with respect to the body, and means for securing said body to a desired support, said securing means also clamping all of said gauge members against movement with respect to the body.

2. Means as set forth in claim 1 in which said gauge members are provided with cooperatively arranged portions of reduced thickness, said securing means bearing against said portions of reduced thickness and being thereby at least partly recessed into the assembly.

3. An adjustable gauge for internal diameters, comprising a body having a plurality of substantially radially slideway portions, gauge members carried by said body and slidable in said slideway portions, said gauge members having partly cylindrical outer faces, means for locking said gauge members against unwanted sliding movement, the inner extremities of said members being spaced from each other and having substantially flat cam surfaces so inclined as to slope toward a common point when the gauge members are equidistant from the axis of the assembly, whereby all of said gauge members may be actuated at once by means of a conical cam.

JOHN C. PARRISH.